Oct. 22, 1957     B. G. ELTON     2,810,486
UNLOADING END GATE FOR VEHICLES
Filed July 19, 1954     2 Sheets-Sheet 2
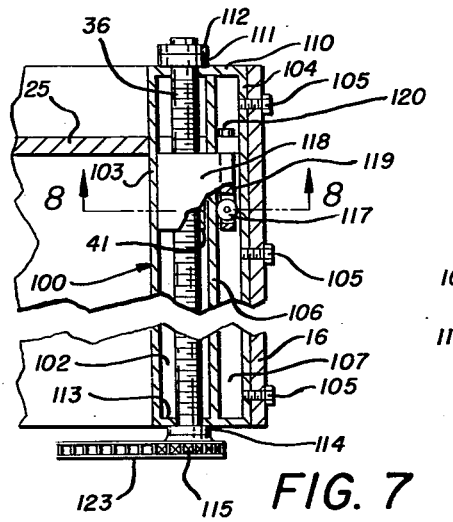
FIG. 7
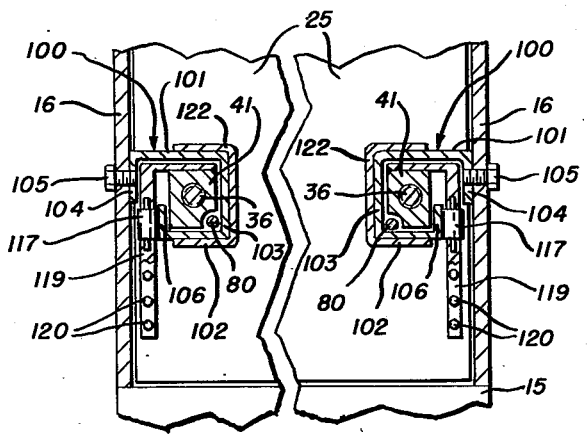
FIG. 8
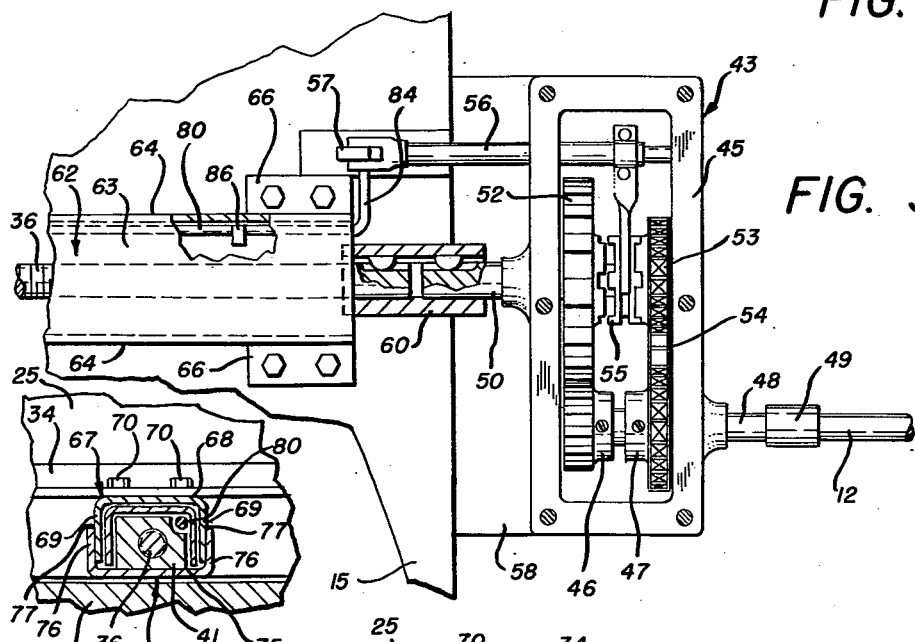
FIG. 3
FIG. 4
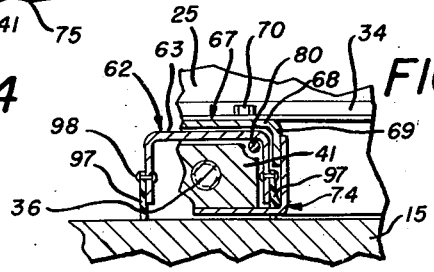
FIG. 5
INVENTOR.
BYRON G. ELTON
BY
Alfred C. Body
ATTORNEY

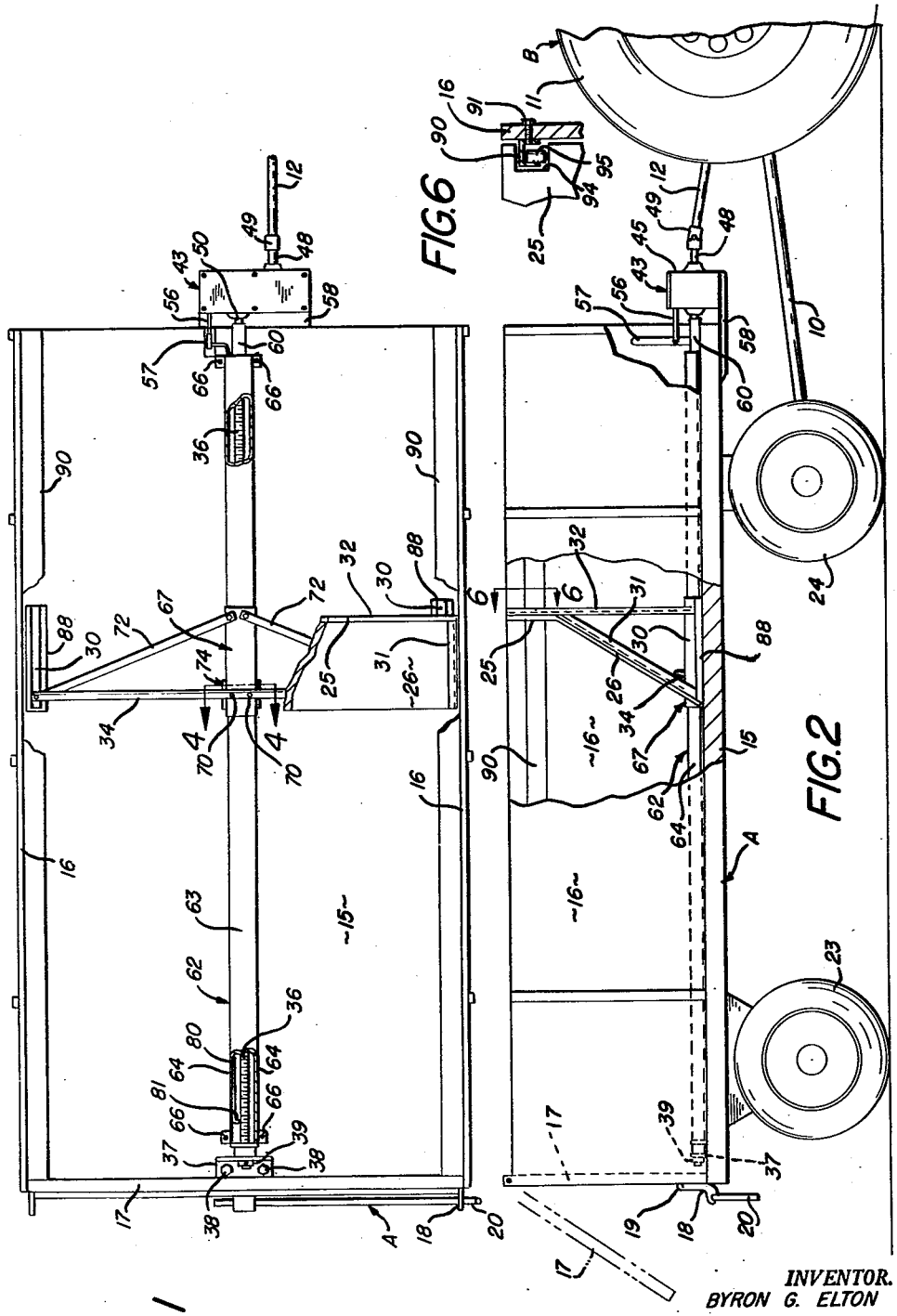

United States Patent Office 2,810,486
Patented Oct. 22, 1957

2,810,486

UNLOADING END GATE FOR VEHICLES

Byron G. Elton, Carroll, Ohio, assignor, by mesne assignments, to The Dunham Company, Berea, Ohio, a corporation of Ohio Application July 19, 1954, Serial No. 444,157

4 Claims. (Cl. 214—82)

This invention pertains to the art of wagon or vehicle unloaders and, more particularly, to a movable endgate arrangement for such a vehicle whereby it may be unloaded by sweeping the vehicle lengthwise with the end gate.

The principal object of the invention is the provision of a new and improved operating mechanism for movable end gates which is simple and rugged in construction, which is easily attached to or removed from a vehicle, which can be readily operated from a power take off on a tractor for the vehicle, which is smooth in operation, which enables the ready reversing of the direction of movement of the end gate and which automatically disengages the mechanism as the end gate approaches either limit of its travel.

In accordance with the invention, there is provided for use in combination with an open-ended wagon or vehicle having parallel sides, an end gate movable from one end of the wagon to the other, power-transmitting means extending the length of the wagon and connected to the end gate, speed-reducing means connected to the power-transmitting means and adapted to be connected to a power take off on a tractor hitched to the vehicle and including direction-reversing means having a forward, neutral and reversed position, a guide member extending the length of the wagon and covering the power transmitting means and a slide member slidable on the guide member and braced to the end gate. The invention may also include means responsive to movement of the gate toward either end of the wagon to shift the direction-reversing means into the neutral position.

In a like manner, the invention may also include means cooperable between the end gate and the sides of the wagon or vehicle for preventing the bulging of the sides of the vehicle due to pressures on the contents thereof because of the longitudinal movement of the end gate.

The invention may take physical form in a number of different appearing parts and arrangements of parts, a preferred embodiment of which will be described in detail hereinafter and illustrated in the accompanying drawings which are a part hereof, and wherein:

Figure 1 is a top elevational view partly in section of a movable end gate embodying the present invention installed in a wagon;

Figure 2 is a side elevational view of the embodiment of Figure 1 with portions broken away;

Figure 3 is a top elevational view illustrating an embodiment of the speed-reducing and direction-reversing mechanism;

Figure 4 is a cross-sectional view of Figure 1 taken approximately on the line 4—4 thereof;

Figure 5 is a view similar to Figure 4 showing a modified embodiment of the invention wherein provision is made for preventing dirt and the like from getting into the apparatus;

Figure 6 is a cross-sectional view of Figure 2 taken on the line 6—6 thereof;

Figure 7 is a top cross-sectional view partly in elevation of a modified embodiment of the invention; and Figure 8 is a cross-sectional view of Figure 7 taken approximately on the line 8—8 thereof.

Referring now to the drawings wherein the showings are for the purposes of illustrating the invention only and not for the purposes of limiting same, the figures show a wagon A mechanically coupled to a towing tractor B through a conventional tow or draw bar 10.

The tractor B forms no part of the present invention and is shown primarily for the purposes of better illustrating the preferred embodiment. Thus, the tractor is conventional and has rear drive wheels 11 and has a rotating power take off not shown connected to a drive shaft 12 projecting beyond the rear of the tractor B.

The wagon A is relatively conventional and includes a generally flat elongated base 15 and spaced parallel extending side walls 16, all as is conventional in the art. The wagon A is also provided with a rear end gate 17 pivoted at its upper edge to the upper left-hand corners of the side walls 16. Suitable mechanism 18 in the form of a yoke 19 and handle 20 pivoted to the rear edge of the base 15 bear against the lower edge of the rear end wall 17 and selectively lock it closed or permit it to open.

The wagon is shown as having rear wheels 23 and front wheels 24, the latter being connected to the draw bar 10 as is conventional.

The front end gate is comprised of a vertically extending upper portion 25 and a lower angular portion 26 which, as shown in Figure 2, angles downwardly and toward the rear of the wagon A. The portions 25 and 26 may be formed as desired but, in the preferred embodiment, are formed from wood planks bolted to a supporting frame. Such frame may be as desired but, in the embodiment shown, is comprised of two edge frame members fastened to the edges of the end gate. Such frame members may consist of a horizontal portion 30, an angular portion 31 fastened to the back side of the portion 26 of the end gate and a vertical member 32 extending from the right end of the horizontal portion 30 fastened to the upper end of the member 31 and extending vertically upwardly therefrom to support and retain the vertical portion 25 of the end gate in position. The members 30, 31, 32 are preferably formed of conventional angle iron. A transverse member 34 also formed of angle iron extends along the back side of the portion 26 between the members 30 of the edge frames and is spaced a slight distance above the lower edge of the portion 26 as will subsequently appear.

In accordance with the invention, power-transmitting means extend from one end of the wagon to the other and is operatively connected to the lower edge of the end gate for moving the end gate in either direction along the base 15. In the embodiment of the invention shown, such power-transmitting means comprise an elongated threaded shaft or lead screw 36 rotatably journaled at its left end in a bracket 37 fastened to the wagon base 15 by means of bolts 38. The left end of the screw 36 has a collar 39 fixed thereon which bears against a roller bearing not shown so that the forces on the shaft 36 when it is advancing the end gate to the left will always be tension forces. There will, thus, be no tendency for the shaft 36 to buckle under the forces required to move the end gate. A lead nut (see Figure 4) 41 is threadably engaged with the lead screw 36 and operatively connected with the lower leading edge of the end gate as will appear to convert the rotary movement of the lead screw 36 into linear movement and, thus, move the end gate fore-and-aft on the wagon A.

It will be noted that the lead screw 36 is spaced from the upper surface of the floor 15 over its entire length, the bracket 37 spacing the left-hand end of the lead screw 36 and the speed-reducing mechanism 43 at the right-hand end of the wagon A supporting the shaft in this spaced position as will appear.

The speed-reducing mechanism 43 is comprised of a housing 45, preferably cast, rotatably supporting a forward gear 46, and a reverse gear 47 on an input drive shaft 48 which extends outwardly through the housing 45 toward the front of the wagon A. A universal joint 49 connects the drive shaft 48 with the shaft 12 connected to the power take off of the tractor B. The gears 46 and 47 are keyed or otherwise fixed to the shaft 48. The output shaft 50 of the speed-reducing means 43 extends toward the rear of the wagon A and is rotatably supported in the housing 45. A forward gear 52 is supported on the shaft 50 rotatable relative thereto and meshes with the forward gear 46. It will be noted that the gear 46 has a lesser number of teeth than the gear 52 so that a speed-reducing action takes place here; that is to say, the shaft 50 rotates at a lesser speed than does the shaft 48. A reverse sprocket 53 is also mounted on the shaft 50 rotatable relative thereto. This reversed sprocket 53 is mechanically connected to the reversed gear or sprocket 47 through an endless chain 54. Thus, when the shaft 48 rotates, both the gear 52 and the sprocket 53 will rotate at all times on the shaft 50 but in opposite directions. A clutch collar 55 splined or keyed to the shaft 50 is interposed between the gear 52 and the sprocket 53. This collar 55 is engageable either with the gear 52 or the sprocket 53 to rotate the shaft 50 in either the forward or reversed direction. An operating slide 56 is mechanically connected with the collar 55 to shift the collar either into engagement with the gear 52 or the sprocket 53 or into an intermediate neutral position. An operating lever 57 mounted on the base 15 at the forward edge thereof is provided for the purpose of actuating the rod 56 and, thus, the clutch collar 55.

The speed-reducing means 43 are so mounted on the leg and base 15 by means of a bracket 58 that the axis of the shaft 50 will be spaced above the upper surface of the wagon base 15. A sleeve 60 keyed to both the right-hand end of the lead screw 36 and the shaft 50 serves to transmit the torque of the shaft 50 to the lead screw 36 and, at the same time, to space the right-hand end of the lead screw 36 above the upper surface of the wagon base 15.

A guide member extends substantially the full length of the wagon base 15 and covers the power-transmitting means. In the embodiment of the invention shown, the guide member is in the form of an inverted U-shaped channel 62 having a base 63 and parallel depending side walls 64. Both ends of the channel 62 have depending bracket members 62 bolted to the upper surface of the wagon base 15, these brackets supporting the channel 62 so that the lower edges of the sides 64 are spaced from the upper surface of the wagon 15. The channel 62 forms a rigid guide member for the end gate from one end of the wagon A to the other. The end gate is guided along this guide member by means of a slide member 67 also of inverted channel shape and having a base 68 and depending side walls 69. The dimensions of the guide member 67 are such that it will slide along the channel 62 with a minimum of friction. Thus, a slight clearance should exist between the inner surfaces of the vertical side walls 69 and the outer surfaces of the vertical side walls 64. The length of the member 67 generally equals about the total horizontal extent of the end gate as shown in Figure 2. This length, in conjunction with the clearance, provides a rigid support for the end gate, preventing it from twisting as it is moved from one end of the wagon to the other. This is particularly desirable where a greater load may be imposed on one side of the end gate than on the other side.

The left-hand or leading edge of the slide member 67 is connected to the transversely extending member 34 by means of bolts 70 substantially as is shown in Figure 4. The trailing or right-hand end of the slide member 67 has a pair of brace members 72 fastened thereto which extend outwardly and at a forward angle to connect to the ends of the member 34. These angular members 72 and the transverse member 34 form a rigid frame structure, transmitting any forces to the slide member 67 tending to cock the end gate as it moves along the wagon and preventing such cocking action.

As shown, the lead nut 41 has a U-channel 74 fastened to its lower surface by any suitable means such as welding as at 75 and has upwardly extending side walls 76 bearing against the outer surface of the side walls 69 of the slide member 67. These side walls 76 may be suitably fastened to the side walls 69 such as by the welds 77 shown in Figure 4.

It will thus appear that as the shaft 12 is rotated and depending upon the position of the clutch collar 55, the end gate will be moved to either the right or left or the front or rear ends of the wagon respectively.

Means responsive to this movement toward either end of the wagon are provided to shift the clutch collar 55 into the neutral position whenever the end gate approaches the desired limits of its travel. Thus, in the embodiment of the invention shown, a rod 80 extends the full length of the channel 62 and between the slide nut 41 and the inner surface of the channel 62. This rod 80 has a stop 81 at its left-hand end which is engaged by the slide nut 41 as it approaches the left-hand limit of its travel. The right-hand end of the rod 80 is connected to the slide rod 56 by a right-angled portion 84. Thus, when the lead nut 41 strikes the stop 81, the clutch collar 55 will be moved into the neutral position and further movement of the end gate in that direction will then be impossible. A stop 86 is provided adjacent the right-hand end of the rod 81 and is engaged by the lead nut 41 as it approaches the right-hand limit of its movement to again shift the clutch collar 55 into the neutral position and prevent further movement of the end gate in that direction.

The weight of the end gate is supported primarily on the wagon base 15 by means of skids 88 fastened to the under surface of the horizontal frame members 30. These skid members 88 are preferably formed of wood and slide along the wagon base 15 in a relatively friction-free manner.

When the end gate is moving toward the left, it is generally pushing a load of material ahead of it off of the left-hand edge of the wagon base 15. Thus, it should move at a relatively slow speed and substantial amounts of power will be required. The speed-reducing means 43 shown provides this action; that is to say, the gear 46 has a lesser number of teeth than the gear 52 so the speed-reducing action takes place. However, when the end gate is being returned to the right, a greater speed with less power is required. With the arrangement shown, the sprocket 47 has approximately the same number of teeth as the sprocket 53 and, for the same rotational speed of the drive shaft 48, a greater rotational speed of the lead screw 36 will result and, thus, the end gate will be brought back at a relatively high speed.

The present invention has enabled an extremely smooth operating end gate. The end gate moves from one end of the wagon to the other without jerks and at a speed such that, if desired, a uniform distribution of goods from the wagon can be deposited on the ground as the tractor pulls the wagon along. Furthermore, the farmer can start the end gate into operation and, thereafter, forget it. He need have no fear that once the end gate has reached the limit of its travel, a jam up of the power transmitting means will result. As soon as the end gate reaches either the rear or forward limits of its travel, the shift rod 80 is actuated to place the clutch of the speed-reducing mechanism in the neutral position. Obviously, this is done completely automatically.

If desired, operating means can be provided from the handle 57 to the tractor B. Such means are not shown.

The present invention also contemplates the provision of means for preventing the sideward bulging of the side panels 16 on the wagon under the pressure of the contents of the wagon as they are being pushed toward the rear thereof by the endwise movement of the end gate. Thus, in the embodiment of the invention shown, an inverted U-shaped channel 90 is fastened by means of bolts 91 to the opposed surfaces of each side panel 16 at a point adjacent to but generally spaced from the upper edge thereof. This channel 90 in and of itself provides considerable rigidity to the side panels 16. However, the end gate is cut away as at 94 to receive the channel 90 and a roller 95 pivotally supported on the end gate edge engages the inner surface of the channel 90 as the end gate moves along the wagon. This roller transmits in a friction-free manner any forces tending to bulge the side panels 16 to the end gate in a manner such as to effectively prevent any bulging of the side panels 16. The construction shown, while simple, is quite effective.

It will be noted from Figure 4 that the lower edges of the walls 64 of the guide channel 62 are relatively close spaced to the upper surface of the wagon base 15. Actually, only enough spacing need be provided to clear the thickness of the U-channel 74. With such close clearance, foreign matter is to a large extent excluded from getting under the channel 62 and interfering with the coaction of the lead screw 36 and the lead nut 41. Foreign matter having dimensions larger than the spacing are obviously excluded. Foreign matter having dimensions smaller than the spacing can work under the channel 62 but cannot build or pile up to a height to reach the shaft 36 which as will be seen from Figure 4 is positioned so that its lower surface is spaced from the upper surface of the wagon base 15 a distance greater than the spacing between the lower edges of the side walls 64 and the upper surface of the wagon base 15. As will be obvious, any fine granular material will not pile up under the channel 62 to a depth any greater than the spacing between the lower edges of the side walls 64 and the upper surface of the wagon base 15. The lead nut 41 may, if desired, have a pointed leading edge 94 for the purpose of pushing aside and plowing through any material which may accumulate under the channel 62.

Preferably, the shaft 36 is used without a lubricant thereon. Thus, dust and lint and other wind-blown materials will not adhere to the surfaces of the shaft 36 and filling the clearances between the threads of the shaft 36 and the nut 41. The use of lubricant on the threaded shaft 36, however, is not excluded.

Figure 5 shows an alternative embodiment of the invention which may be used in the event that it is desired to use a lubricated shaft 36 and all dirt and the like must be excluded from under the channel 62. In this embodiment of the invention, a strip of flexible material 97 which may be of rubber or the like is fastened to the outer lower edge of the channel side walls 64 and extends therebeyond into contact with the upper surface of the wagon base 15. The material may be fastened to the channel side walls 64 in any desired manner such as being vulcanized or by means of small bolts 98. It will be noted from the right-hand side of Figure 5 that the lower edge of the side walls 69' of the slide 67 terminate short of the upper surface of the flexible member 97. The left-hand side of Figure 5 shows the flexible member 97 in its normal unflexed state. As the lead nut 41 moves lengthwise of the wagon, the member 97 flexes outwardly to permit passage of the channel 74. As soon as the channel 74 has passed, however, the members 97 again assume the unflexed position as shown in the left-hand side of Figure 5.

The invention has been described with reference to the use of a single power-transmitting means positioned generally along the center of the base 15 of the wagon. With this arrangement, it will be noted that the power is applied to the lower leading edge of the end gate. This is where, normally, the greatest resistance to the movement of the end gate is expected. Also, by applying the power to the end gate at this point, it will be noted that the lower leading edge of the end gate can be advanced very close to the back end of the base 15. If it is desirable that the lower leading edge of the end gate come flush with the back edge of the wagon base 15, it will be appreciated that the brackets 37 and 66 could be so mounted as to extend beyond the back end of the wagon base 15. Alternatively, the lead nut on its point of attachment to the end gate could be varied so that the lead nut, instead of being directly under the leading front edge of the end gate would be positioned midway along the slide 67.

Obviously, more than one power-transmitting means can be employed. Figures 7 and 8 show a modified embodiment of the invention employing a pair of power-transmitting means located one at each side of the wagon and, in this embodiment, spaced upwardly from the wagon base 15. Additionally, in this embodiment of the invention, the power-transmitting means are employed in conjunction with the supporting means to keep the side panels 16 from bulging outwardly. Thus, in the embodiment of the invention shown, a guide and structural member 100 fastened to the side panels 16 is provided, this member being fastened to the side panel 16 midway between the top and bottom thereof.

The member 100 is generally rectangular in cross section and has a top wall 101, a bottom horizontal wall 102 integrally joined by a vertical inward wall 103. The other edge of the top wall 101 terminates in a downwardly extending flange 104 which is bolted to the side panel 16 by means of bolts 105 or any other suitable fastening means. The bottom side wall 102 is shorter than the upper wall 101 and terminates in an upwardly extending flange 106 which, as shown, is spaced from the wall 16 and provides an opening 107 into the interior of the member 100 over its entire length. A lead screw 36 extends the length of the member 100. Its rearmost end is journaled in an end panel 110 by roller bearings 111 and is retained in position by a collar 112. The opposite end is journaled in an end panel 113 on a roller bearing 114 and this end is provided with a sprocket 115 employed for rotating the lead screw 36. A lead nut 41 identical to the one shown in Figure 5 is also provided and a control rod 80 similar to the one shown in the preferred embodiment is also provided on the interior of the member 100. An inverted L-shaped member having a horizontal portion 118 welded to the upper surface of the lead screw 41 extends toward the side panel 16 and thence downwardly through the opening 107 where the vertical portion 119 is fastened to the end gate by means of bolts 120. This vertical leg has an opening opposite the flange 106 in which a roller 117 is rotatably supported. This roller bears against the right-hand surface of the flange 106 and transmits forces on the side panel 16, tending to bulge them outwardly to the end gate to thus resist such forces.

The invention contemplates an exactly similar construction mounted on the opposite side panel 16 to be driven through a common chain 123 to a sprocket on the gear-reducing mechanism 45 mounted at any suitable point on the wagon.

The vertical spacing of the mechanism from the wagon base 15 may be adjusted as desired. Normally, it will be spaced from the base 15 a distance so as to correspond to the contemplated center of thrust on the end gate. Obviously, if this center of thrust is too low, then the member 100 cannot perform its functioning of preventing the side panels 16 from bulging. In this instance, then, the dual function of the member 100 must be dispensed with and a separate reinforcing member for the side panels 16 provided.

However, if the mechanism is spaced approximately half way of the height of the side panel 16, the member 100 can very adequately provide the function of preventing the bulging of the side panels 16 serving as a guide for the slide 122 and as a housing to cover up the threaded shaft 36 and protect it from the entrance of dirt and other foreign materials. In this respect, it will be noted that with the cross-sectional shape of the structural member shown, the interior thereof is quite adequately protected from the entrance of foreign materials which may be loaded on the wagon. If desired, however, a flexible member similar to that shown in Figure 6 could be employed fastened on the lower wall 102 and extending toward the side panel 16.

The invention has been described with reference to preferred embodiments. Obviously, modifications and alterations will occur to others upon a reading and understanding of this specification differing radically in appearance from the preferred embodiment described. It is my intention to include all such alterations and modifications insofar as they come within the scope of the appended claims, or the equivalent thereof.

Having thus described my invention, I claim:

1. In apparatus of the type described, a wagon comprised of a base and parallel extending side walls, an end base movably supported on said wagon, a generally hollow structural member fastened to said side walls and having a downwardly facing longitudinal opening, a threaded shaft in said member, a lead nut on said shaft, means extending through said opening interconnecting said end gate and said lead nut whereby to drive said end gate from one end of said wagon to the other and simultaneously by bearing against said member to provide a cross-bracing member for said side walls.

2. A movable end gate attachment for wagons and the like having at least a base and parallel extending side walls, comprising in combination an end gate of approximately the width between said sidewalls and means for propelling and guiding such end gate including an inverted U-shaped channel adapted to extend the full length of the wagon, a second U-shaped channel of relatively short length slidable over the outer surfaces of said first channel and mechanically braced to said end gate, a threaded shaft within said first mentioned channel and extending substantially the length thereof, a thrust bearing at one end of first mentioned channel for said shaft, a lead nut on said shaft and mechanically connected to said second mentioned channel, reversing power means at the opposite end of said first mentioned channel and connected to said threaded shaft and means for mounting said first mentioned channel on said wagon with the lower edges of said channel in slightly spaced relationship with said base.

3. A movable end gate attachment for wagons and the like having at least a base and parallel extending sidewalls comprising in combination an end gate of approximately the width between said sidewalls and means for propelling and guiding such end gate including an inverted U-shaped channel adapted to extend the full length of the wagon, a second U-shaped channel of relatively short lengths slidable over the outer services of said first channel and mechanically connected to said end gate, power transmitting means extending under said first channel and connected to said second channel, track means adapted to be fastened to the upper edge of each sidewall and means on said end gate spaced from the lower edge thereof slidably engaged with said track means for preventing the bulging of said sidewalls due to sideward forces thereon for movement of the end gate.

4. An apparatus of the type described, a wagon having a base and parallel extending sidewalls, an end gate movable over the length of said base between said sidewalls, a threaded shaft spaced from the upper surface of said base and cooperatively engaged with said end gate, an inverted U-shaped channel over said threaded shaft with the lower edge thereof spaced closer to the upper surface of said base than the closest spacing of said threaded shaft, and flexible means extending from the lower edges of said channel into engagement with the upper surface of said base.

References Cited in the file of this patent

UNITED STATES PATENTS

| | | |
|---|---|---|
| 1,567,690 | Weaver | Dec. 29, 1925 |
| 1,961,587 | Hulley et al. | June 5, 1934 |
| 2,002,993 | Ehrick et al. | May 28, 1935 |
| 2,047,602 | Tomlinson | July 14, 1936 |
| 2,166,846 | McCalley | July 18, 1939 |
| 2,258,988 | Le Laurin | Oct. 14, 1941 |
| 2,541,538 | Newell | Feb. 13, 1951 |
| 2,569,161 | Golay | Sept. 25, 1951 |
| 2,643,014 | Calcagno | June 23, 1953 |
| 2,711,836 | West | June 28, 1955 |
| 2,760,658 | Smith | Aug. 28, 1956 |